US012631216B2

(12) United States Patent
Yamada

(10) Patent No.: US 12,631,216 B2
(45) Date of Patent: May 19, 2026

(54) ANGULAR BALL BEARING

(71) Applicant: NTN CORPORATION, Osaka (JP)

(72) Inventor: Hiroaki Yamada, Kuwana (JP)

(73) Assignee: NTN Corporation, Osaka (JP)

( * ) Notice: Subject to any disclaimer, the term of this patent is extended or adjusted under 35 U.S.C. 154(b) by 296 days.

(21) Appl. No.: 18/015,905

(22) PCT Filed: Jul. 26, 2021

(86) PCT No.: PCT/JP2021/027499
§ 371 (c)(1),
(2) Date: Sep. 12, 2023

(87) PCT Pub. No.: WO2022/024978
PCT Pub. Date: Feb. 3, 2022

(65) Prior Publication Data
US 2023/0407918 A1      Dec. 21, 2023

(30) Foreign Application Priority Data
Jul. 28, 2020      (JP) ................................. 2020-127304

(51) Int. Cl.
*F16C 33/38*      (2006.01)
*F16C 19/16*      (2006.01)

(52) U.S. Cl.
CPC ........ *F16C 33/3856* (2013.01); *F16C 19/163* (2013.01); *F16C 2240/46* (2013.01); *F16C 2240/80* (2013.01)

(58) Field of Classification Search
CPC ........ F16C 19/14; F16C 19/16; F16C 19/163; F16C 33/3837; F16C 33/3843;
(Continued)

(56) References Cited

U.S. PATENT DOCUMENTS 5,906,441 A      5/1999   Seki
2004/0208408 A1   10/2004   Kobayashi et al.
(Continued)

FOREIGN PATENT DOCUMENTS

CN      106460929 A      2/2017
CN      107917138 A      4/2018
(Continued)

OTHER PUBLICATIONS

Machine Translation of JP-2004232773-A (Year: 2004).*
(Continued)

*Primary Examiner* — Alan B Waits
(74) *Attorney, Agent, or Firm* — Rimon P.C.

(57) ABSTRACT

A cage is asymmetrical to a radially extending straight line extending. Supposing that $\alpha$ is the angle of contact of the rolling element, $\alpha$ is defined as $30°\leq\alpha\leq45°$. The relationship defined in the numerical expression is satisfied, where D is the outer diameter of the outer ring, d is the inner diameter of the inner ring, and Da is the diameter of the rolling element. With center axes of the whole bearing in an axial direction and of the cage in the axial direction overlapping each other, at least one of the following relationships is satisfied;

$$0.62 \leq \frac{2D_a}{D-d} \leq 0.80 \tag{1}$$

$$A/Da \leq 0.020 \tag{2, and}$$

$$2A/PCD \leq 0.010 \ldots \tag{3,}$$

where A is the smallest dimension value of a clearance in a radial direction between surfaces of a pocket of the cage
(Continued)

facing the rolling element and of this rolling element, and PCD is the pitch diameter of each rolling element.

6 Claims, 7 Drawing Sheets

(58) Field of Classification Search
CPC .............. F16C 33/3856; F16C 33/3887; F16C 2240/46; F16C 2240/70; F16C 2240/80
See application file for complete search history.

(56) References Cited

U.S. PATENT DOCUMENTS

| | | | | |
|---|---|---|---|---|
| 2016/0319868 | A1* | 11/2016 | Kirchhoff | ........... F16C 33/6696 |
| 2018/0100540 | A1* | 4/2018 | Forster | ................. F16C 33/585 |
| 2019/0264744 | A1* | 8/2019 | Lin | ..................... F16C 33/3887 |
| 2019/0368540 | A1 | 12/2019 | Kenmochi et al. | |

FOREIGN PATENT DOCUMENTS

| | | | |
|---|---|---|---|
| CN | 109964055 | A | 7/2019 |
| DE | 202018105816 | U1 | 11/2018 |
| JP | H04-34512 | A | 3/1992 |
| JP | H04-078331 | U | 7/1992 |
| JP | H09-236127 | A | 9/1997 |
| JP | 2003-166551 | A | 6/2003 |
| JP | 2004-052785 | A | 2/2004 |
| JP | 2004-084768 | A | 3/2004 |
| JP | 2004232773 | A * | 8/2004 ............ F16C 19/163 |
| JP | 2008-169998 | A | 7/2008 |
| JP | 2008-309178 | A | 12/2008 |
| JP | 2013-72499 | A | 4/2013 |
| JP | 2013-228034 | A | 11/2013 |
| JP | 2015-52365 | A | 3/2015 |
| JP | 2016-095037 | A | 5/2016 |
| JP | 2016118294 | A * | 6/2016 ............. F16C 19/10 |
| TW | M573802 | U | 2/2019 |
| WO | WO-2015129064 | A1 * | 9/2015 ............. F16C 19/10 |

OTHER PUBLICATIONS

Machine Translation of WO-2015129064-A1 (Year: 2015).*
Machine Translation of JP 2016118294 (Year: 2016).*
International Search Report issued in corresponding International Patent Application No. PCT/JP2021/027499, dated Aug. 17, 2021, with English translation.

* cited by examiner

1

ANGULAR BALL BEARING

TECHNICAL FIELD

This disclosure relates to an angular ball bearing.

BACKGROUND ART

Angular ball bearings may be typically used in, for example, compressors, pumps and injection molding machines. To enhance the levels of performance of such devices, higher added values are required of these bearings. The angular ball bearings should desirably further increase their load-carrying capacities for higher added values, particularly importantly for longer rolling-contact fatigue lives. Japanese Patent Laying-Open No. 2008-309178 (patent literature 1) presents a technology in which an inclined cage is used to effectively increase the load-carrying capacity of the angular ball bearing without any increase in width dimension. Japanese Patent Laying-Open No. 2016-118294 (patent literature 2) presents an angular ball bearing provided with an increased number of rolling elements for greater load-carrying capacities, particularly importantly for better load capabilities in the axial direction of the bearing.

Japanese Utility Model Laying-Open No. H04-78331 (patent literature 3) also describes an example of the angular ball bearings. This patent literature; Japanese Utility Model Laying-Open No. H04-78331, describes an angular ball bearing equipped with an inner ring, an outer ring, a cage, and rolling elements. The cage has a plurality of pockets in which the rolling elements are containable. The rolling elements are inserted into the pockets from an inner diameter side of the cage. Thus, any movement of the cage toward an outer diameter side may be surely limited to a certain extent, and the inner ring, cage and rolling elements may be thereby allowed to integrally move in a stable manner.

To allow for a greater thrust load, such an angular ball bearing may often have a shoulder portion large in height in which the inner ring extends to the outer diameter side or the outer ring extends to the inner diameter side from the groove bottom of the bearing ring. In this instance, a cylindrical cage laterally symmetrical in the axial direction of the bearing may be difficult to use. Another difficulty in this instance may be increase of the radial size of the bearing. Hence, a resin-made cage laterally asymmetrical in the axial direction may be used in such a bearing. This may ensure a large area in cross section of the cage.

CITATION LIST

Patent Literature

PTL 1: Japanese Patent Laying-Open No. 2008-309178
PTL 2: Japanese Patent Laying-Open No. 2016-118294
PTL 3: Japanese Utility Model Laying-Open No. H04-78331

SUMMARY OF INVENTION

Technical Problem

In the case of the resin-made cages as described in these literatures, inner and outer diameters of the cage are radially away from the pitch diameter (PCD) of a rolling element set relative to the bearing center, and each pocket has a spherical shape. In these cases, a force that drags the cage into between the rolling elements and the inner and outer rings is likely to increase, which possibly disturbs the rotary motions of the rolling elements. This may accelerate slippage between the rolling elements and raceway surfaces of the inner and outer rings. Any grease-lubricated bearings may result in greater resistance during use, which may often lead to instability of the cage and higher risks of noise, vibration and/or temperature rise of the bearing. Such problems as noise, vibration and/or temperature rise of the bearing in the earlier patent literatures are yet to be solved, for which there is still room for improvement.

This disclosure is directed to solving these problems of the known art. To this end, this disclosure is directed to providing an angular ball bearing designed under conditions in which abnormal noise, vibration and/or temperature rises of the bearing are avoidable.

SOLUTION TO THE PROBLEM

An angular ball bearing described herein includes an inner ring, an outer ring, a plurality of rolling elements, and a cage. The inner ring has, on an outer circumferential surface thereof, an inner ring raceway surface. The outer ring is disposed on an outer side than the inner ring. The outer ring has, on an inner circumferential surface thereof, an outer ring raceway surface. The rolling elements are disposed between the inner ring raceway surface and the outer ring raceway surface. The rolling elements each contact the inner ring raceway surface and the outer ring raceway surface at positions at which an angle of contact is made with a radial direction. The cage is disposed between the inner ring raceway surface and the outer ring raceway surface. The cage retains the rolling elements in a manner that the rolling elements are annularly arranged and circumferentially spaced at certain intervals. The cage has a plurality of pockets in which the rolling elements are retainable, and these pockets are circumferentially spaced at certain intervals. The cage is asymmetrical to a straight line extending in the radial direction Supposing that $\alpha$ is the angle of contact of the rolling element, $\alpha$ is defined as $30°{\leq}\alpha{\leq}45°$. Further, the relationship defined in the following numerical expression is satisfied, where D is the outer diameter of the outer ring, d is the inner diameter of the inner ring, and Da is the diameter of the rolling element.

[Numerical Expression 1]

$$0.62 \leq \frac{2D_a}{D-d} \leq 0.80 \tag{1}$$

With center axes of the whole bearing in the axial direction and of the cage in the axial direction overlapping each other, at least one of the following relationships is satisfied;

$$A/Da{\leq}0.020 \ldots \tag{2}$$

and $$2A/PCD{\leq}0.010 \ldots \tag{3}$$

where A is the smallest dimension value of a clearance in the radial direction between surfaces of the pocket of the cage facing the rolling element and of this rolling element, and PCD is the pitch diameter of each rolling element.

ADVANTAGEOUS EFFECTS OF INVENTION

The technology disclosed herein may provide an angular ball bearing designed under conditions in which abnormal noise, vibration and/or temperature rises of the bearing are avoidable.

DESCRIPTION OF EMBODIMENTS

An embodiment of this disclosure is hereinafter described in detail referring to the accompanying drawings.

Figure 1:
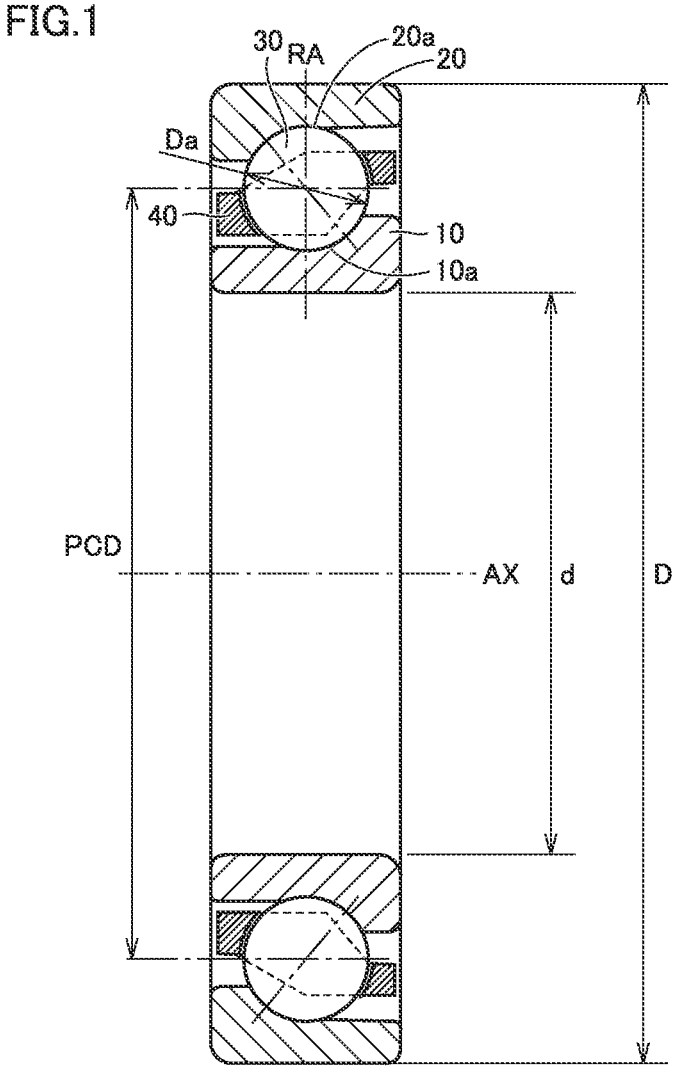
FIG. 1 is a schematic view in cross section of an angular ball bearing according to an embodiment of this disclosure.
Figure 2:
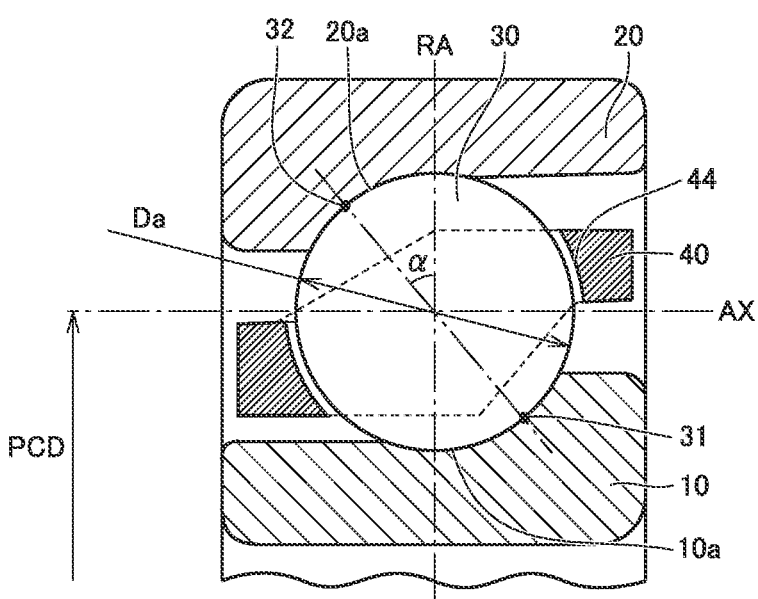
FIG. 2 is a schematic enlarged view in cross section of FIG. 1 in part.

FIG. 1 is a schematic view in cross section of an angular ball bearing according to this embodiment. FIG. 2 is a schematic enlarged view in cross section of FIG. 1 in part. Referring to the cross-sectional views of FIGS. 1 and 2, the vertical direction is a radial direction RA of the angular ball bearing, and the lateral direction is an axial direction AX of the angular ball bearing. This angular ball bearing includes an inner ring 10, an outer ring 20, rolling elements 30, and a cage 40. Inner ring 10 and outer ring 20 each have an annular shape. Outer ring 20 is disposed on the outer side in radial direction RA than inner ring 10.

Inner ring 10 has, on its outer circumferential surface, an inner ring raceway surface 10a. Outer ring 20 has, on its inner circumferential surface, an outer ring raceway surface 20a. Thus, inner ring raceway surface 10a and outer ring raceway surface 20a are facing each other in radial direction RA. Multiple rolling elements 30 are spaced at certain intervals along the circumferential direction of the bearing and are disposed between inner ring raceway surface 10a and outer ring raceway surface 20a. An optional number of, either even or odd number of rolling elements 30 may be used. The surface of each rolling element 30 contacts inner ring raceway surface 10a at an inner ring contact point 31 and further contacts outer ring raceway surface 20a at an outer ring contact point 32. These inner and outer ring contact points 31 and 32 are displaced from each other in axial direction AX. Hence, a straight line that connects inner and outer ring contact points 31 and 32 extends in a direction that differs from a straight line extending in radial direction RA. These straight lines make an angle of contact α with each other. Thus, rolling element 30 is a spherical body disposed so as to contact inner ring raceway surface 10a and outer ring raceway surface 20a at positions at which angle of contact α is made with radial direction RA. Angle of contact α may be defined as $30° \leq α \leq 45°$.

Figure 3:
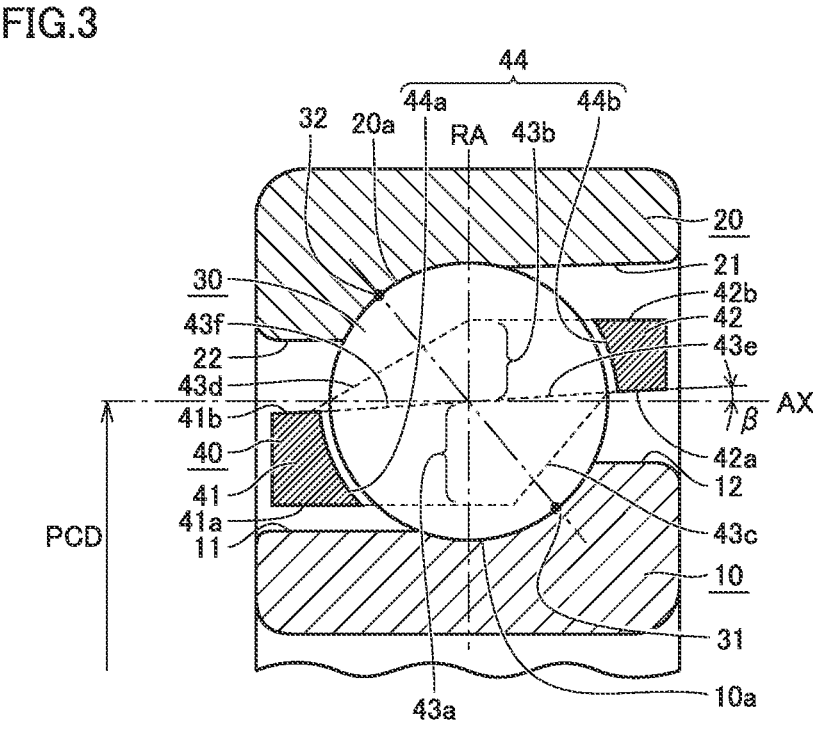
FIG. 3 is a schematic enlarged view in cross section in which reference symbols are appended to structural elements in the same regions as in FIG. 2.

Cage 40 is located between inner ring raceway surface 10a and outer ring raceway surface 20a. Conventionally, cage 40 may be disposed in a manner that extends from a region between inner ring raceway surface 10a and outer ring raceway surface 20a to a region between a first counter-bored portion 11 and a second shoulder portion 22 and also to a region between a first shoulder portion 12 and a second counter-bored portion 21. In the examples of FIGS. 1 to 3, cage 40 is thus characterized. Cage 40 has a substantially annular shape that allows this cage to hold rolling elements 30 in a manner that they are annularly arranged and circumferentially spaced at certain intervals. Cage 40 has a plurality of pockets 44; cavities formed in the body of cage 40, in which rolling elements 30 are retainable. Pockets 44 are circumferentially spaced at certain intervals. One each of rolling elements 30 is retainable in each of pockets 44 of cage 40.

Cage 40 may preferably be made of a synthetic resin.

Inner ring raceway surface 10a and outer ring raceway surface 20a each have a region that extends in part with an inclination relative to axial direction AX. As with inner ring raceway surface 10a, cage 40 extends so as to incline relative to axial direction AX Cage 40 is asymmetrical to a straight line extending in radial direction RA. At substantially a middle position in axial direction AX, a portion of cage 40 on the left side relative to a straight line in radial direction RA is situated on the inner side in radial direction RA than a portion of cage 40 on the right side relative to a straight line in radial direction RA, as illustrated in FIG. 2.

The relationship defined in the following numerical expression is satisfied, where D is the outer diameter of outer ring 20 and d is the inner diameter of inner ring 10, as illustrated in FIG. 1, and Da is the diameter of rolling element 30 as illustrated in FIG. 2.

[Numerical Expression 2]

$$0.62 \leq \frac{2D_a}{D-d} \leq 0.80 \tag{1}$$

According to this embodiment, the following relationship is satisfied, which will be described later in detail. With center axes of the whole angular ball bearing in axial direction AX and of cage 40 in axial direction AX overlapping each other, the following relationship is satisfied;

$$A/Da \leq 0.020 \ldots \tag{2, or}$$

$$2A/PCD \leq 0.010 \ldots \tag{3,}$$

where A is the smallest dimension value of a clearance in radial direction RA between surfaces of pocket 44 of cage 40 facing rolling element 30 and of this rolling element 30 (the smallest dimension value A may be shown in FIGS. 9 and 10 as "dimension A"), and PCD is the pitch diameter of each rolling element 30 as illustrated in FIG. 1. Pitch diameter PCD is the diameter of a virtual circle centered on the center axis of the angular ball bearing extending in axial direction AX and formed by connecting centers of rolling elements 30 in the circumferential direction.

Figure 4:
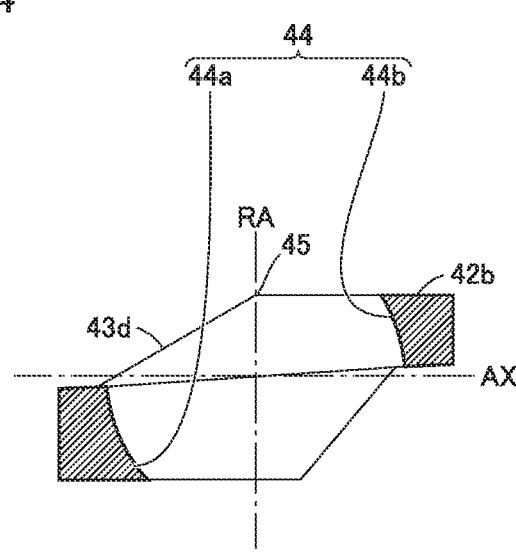
FIG. 4 is a schematic view in cross section of a first exemplified shape after a cage is removed from what is illustrated in FIG. 2 or 3.
Figure 5:
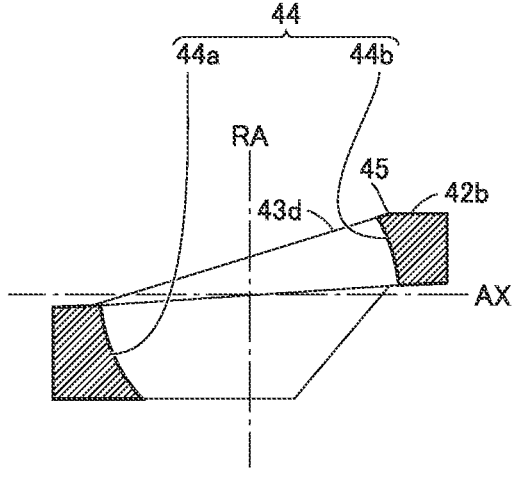
FIG. 5 is a schematic view in cross section of a second exemplified shape after a cage is removed from what is illustrated in FIG. 2 or 3.
Figure 6:
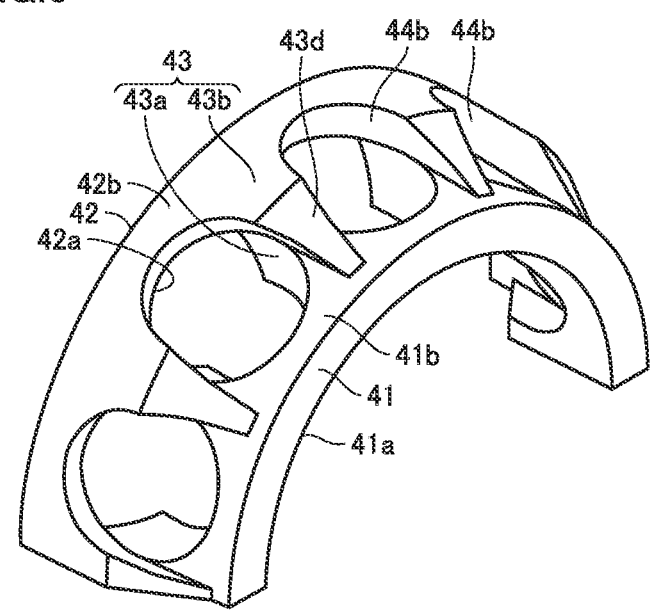
FIG. 6 is a schematic perspective view of the cage in part according to this embodiment.
Figure 7:
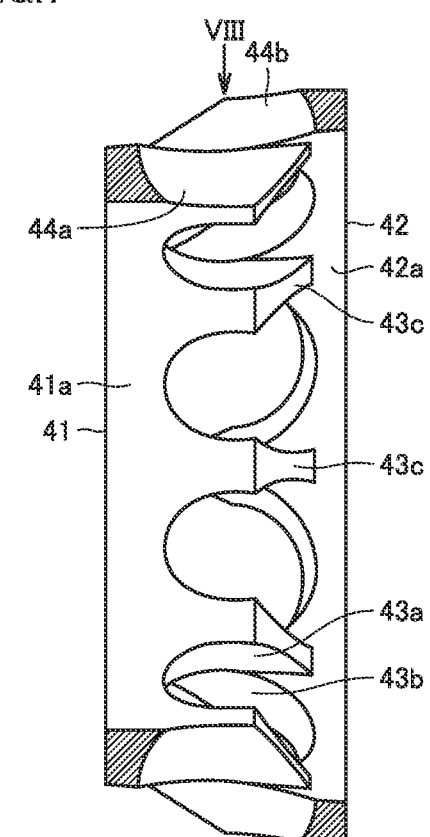
FIG. 7 is a schematic perspective view of the cage according to this embodiment when partly viewed from the inner side of an annular portion.
Figure 8:
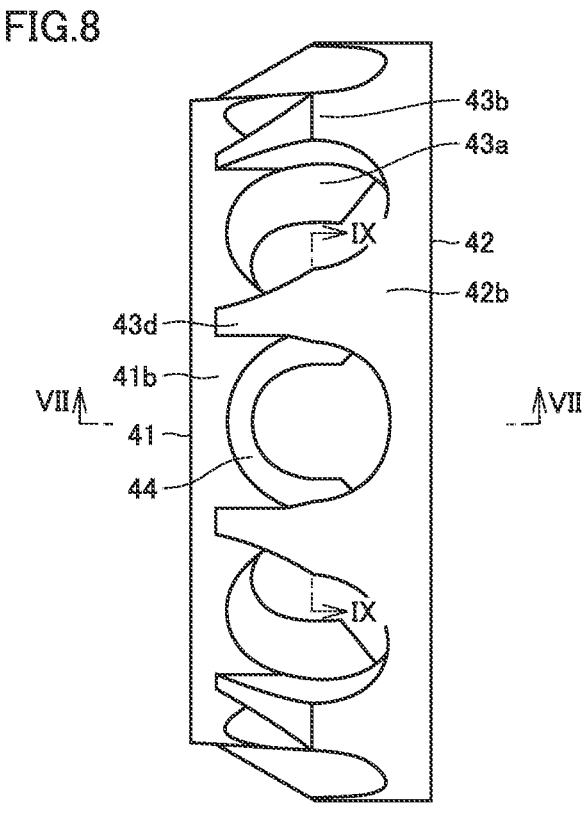
FIG. 8 is a schematic upper view of FIG. 7 when viewed from a direction VIII illustrated with an arrow.
Figure 9:
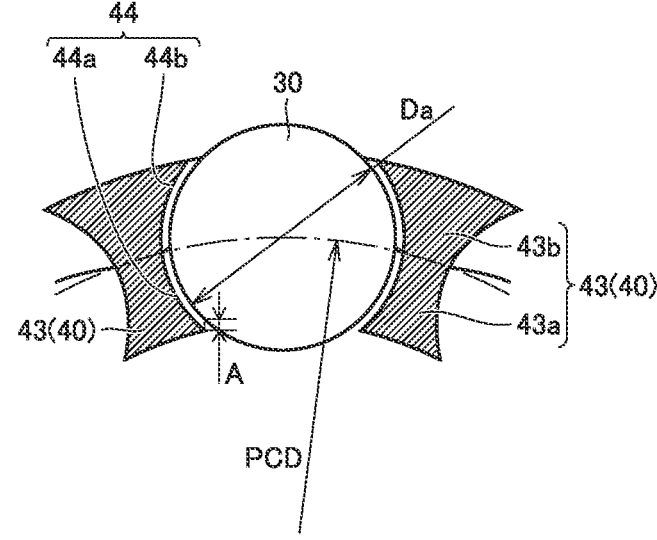
FIG. 9 is a schematic view in cross section of FIG. 8 along a line segment IX-IX.
Figure 10:
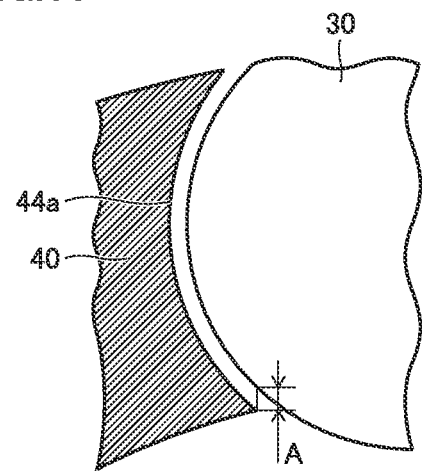
FIG. 10 is a schematic enlarged view in cross section of FIG. 9 in part.

FIG. 3 is a schematic enlarged view in cross section in which reference symbols are appended to structural elements in the same regions as in FIG. 2. FIG. 4 is a schematic view in cross section of a first exemplified shape after the cage is removed from what is illustrated in FIG. 2 or 3. FIG. 5 is a schematic view in cross section of a second exemplified shape after the cage is removed from what is illustrated in FIG. 2 or 3. FIG. 6 is a schematic perspective view of the cage in part according to this embodiment. FIG. 7 is a schematic perspective view of the cage according to this embodiment when partly viewed from the inner side of an annular portion. In FIG. 7 is schematically illustrated a view along a line segment VII-VH in FIG. 8. FIG. 8 is a schematic upper view of FIG. 7 when viewed from a direction VIII illustrated with an arrow. FIG. 9 is a schematic view in cross section of FIG. 8 along line segment IX-IX. FIG. 10 is a schematic enlarged view in cross section of FIG. 9 in part.

Referring to FIG. 3, inner ring 10 according to this embodiment has a first counter-bored portion 11 and a first shoulder portion 12. Inner ring 10 further has an inner ring raceway surface 10a in a region between first counter-bored portion 11 and first shoulder portion 12. First shoulder portion 12 is a region bulging toward outer ring 20 as compared with first counter-bored portion 11. First counter-bored portion 11 and first shoulder portion 12 are both extending (spreading) substantially in a direction along axial direction AX.

Likewise, outer ring 20 according to this embodiment has a second counter-bored portion 21 and a second shoulder portion 22. Outer ring 20 further has an outer ring raceway surface 20a in a region between second counter-bored portion 21 and second shoulder portion 22. Second shoulder portion 22 is a region bulging toward inner ring 10 as compared with second counter-bored portion 21. Second counter-bored portion 21 and second shoulder portion 22 are both extending (spreading) substantially in a direction along axial direction AX. Inner ring 10 or outer ring 20 (outer ring 20 in the example illustrated in FIGS. 2 and 3) has a counter. Second counter-bored portion 21 of FIG. 3, therefore, is extending, to be exact, in a direction displaced through a small angle relative to axial direction AX. In the description above, the "direction along axial direction AX" is used to refer to directions including a direction(s) thus displaced through a small angle(s).

In the description above, first counter-bored portion 11 extends substantially parallel to axial direction AX, and second counter-bored portion 21 has a counter. Alternatively, second counter-bored portion 21 may instead extend substantially parallel to axial direction AX, and it may be first counter-bored portion 11 that has a counter. The counter may have a shape including two regions differently angled relative to axial direction AX. The boundary that divides these two regions is a bent portion. Either one of these two regions may extend and spread substantially parallel to axial direction AX, or these two regions may both extend and spread in a direction displaced through a small angle relative to axial direction AX, so that each of the regions is allowed to have a counter. The counter may include two regions dividable with a step being interposed therebetween. There is an interval (step), which is a radial height difference, between one and the other one of these two regions. The step may be part of a spherical surface circular in cross section or may constitute any other optional curved surface. In this instance, either one of first counter-bored portion 11 and second counter-bored portion 21 may extend substantially parallel to axial direction AX.

Referring to FIGS. 4 to 8, cage 40 has an annular shape similarly to inner ring 10 and outer ring 20. Cage 40 includes a small annular portion 41, a large annular portion 42, and pillar portions 43. These small annular portion 41, large annular portion 42 and pillar portions 43 are not separate members independent from one another but are all regions that constitute cage 40. Small annular portion 41, large annular portion 42 and pillar portions 43 are all integral with one another, forming a single structural element; cage 40.

Small annular portion 41 is a region of cage 40 having an annular shape relatively small in diameter. Small annular portion 41 is on a side closer to inner ring 10 than large annular portion 42. Thus, small annular portion 41 is located between first counter-bored portion 11 and second shoulder portion 22. Large annular portion 42 is a region of cage 40 having an annular shape relatively large in diameter. Large annular portion 42 is on a side closer to outer ring 20 than small annular portion 41. Thus, large annular portion 42 is located between second counter-bored portion 21 and first shoulder portion 12. Small annular portion 41 and large annular portion 42 are arranged substantially along axial direction AX, i.e., in the direction of width of the angular ball bearing.

Pillar portions 43 are each situated along the direction of width between small annular portion 41 and large annular portion 42 so as to connect small annular portion 41 and large annular portion 42. In this portion, cage 40 has pockets 44, cavities formed in this cage, in which rolling elements 30 are retainable. In a region between small annular portion 41 and large annular portion 42, a plurality of pillar portions 43 are circumferentially spaced at certain intervals. Pockets 44; cavities, are circumferentially formed between pillar portions 43, and rolling elements 30 are retained in these pockets. Pillar portions 43 thus situated are each interposed between rolling elements 30 circumferentially arranged next to each other.

Pillar portions 43 each have an inner diameter pillar portion 43a and an outer diameter pillar portion 43b. Inner diameter pillar portion 43a extends substantially along axial direction AX from small annular portion 41 toward large annular portion 42 and between small annular portion 41 and large annular portion 42. Outer diameter pillar portion 43b extends substantially along axial direction AX from large annular portion 42 toward small annular portion 41 and between these annular portions 42 and 41.

Inner diameter pillar portion 43a is disposed on a relatively inner side of pillar portion 43, i.e., on a side of pillar portion 43 closer to inner ring 10. A radially outermost virtual surface of inner diameter pillar portion 43a, i.e., a virtual surface of this pillar portion closer to outer ring 20 is an outermost surface 43e. Outer diameter pillar portion 43b is located on a relatively outer side of pillar portion 43, i.e., on a side of pillar portion 43 closer to outer ring 20. An innermost virtual surface of outer diameter pillar portion 43b, i.e., a virtual surface of this pillar portion closer to inner ring 10 is an innermost surface 43f. Outermost surface 43e and innermost surface 43f are connected to stay in contact with each other. These surfaces 43e and 43f are virtual surfaces left unexposed inside of pillar portion 43. Pillar portion 43 may be viewed such that its inner diameter pillar portion 43a and outer diameter pillar portion 43b are connected to each other on these virtual outermost surface 43e and innermost surface 43*f*. In other words, outermost surface 43*e* and innermost surface 43*f* thus connected to each other is a continuous single plane in an end product of cage 40. In pillar portion 43 thus obtained, inner diameter pillar portion 43*a* and outer diameter pillar portion 43*b* are integral with each other.

Inner diameter pillar portion 43*a* has a first axial side surface 43*c* on a side close to large annular portion 42, i.e., on the right side on FIG. 3. First axial side surface 43*c* of inner diameter pillar portion 43*a* is a surface inclined in both of radial direction RA and axial direction AX and reaching large annular portion 42 or outer diameter pillar portion 43*b* (inclined surface). As illustrated in FIG. 3, small annular portion 41 has a first inner diametrical surface 41*a* which is a surface closest to inner ring 10, and a first outer diametrical surface 41*b* which is a surface closest to outer ring 20. Large annular portion 42 has a second inner diametrical surface 42*a* which is a surface closest to inner ring 10, and a second outer diametrical surface 42*b* which is a surface closest to outer ring 20. First axial side surface 43*c* in the cross-sectional view of FIG. 3 extends from an end closest to large annular portion 42 in FIG. 3 and flush with first inner diametrical surface 41*a*, reaching second inner diametrical surface 42*a* of large annular portion 42 or, for example, innermost surface 43*f* of outer diameter pillar portion 43*b* illustrated in FIG. 3. Then, first axial side surface 43*c* is connected to and thus continuous to either one of these surfaces.

First axial side surface 43*c* in the cross-sectional view of FIG. 3 may preferably make an angle in the range of 45° to 65° with axial direction AX. A point at which an end flush with first inner diametrical surface 41*a* and closest to large annular portion 42 intersects with first axial side surface 43*c* may be closer to large annular portion 42 than a middle position in axial direction AX of the angular ball bearing.

Outer diameter pillar portion 43*b* has a second axial side surface 43*d* on a side close to small annular portion 41, i.e., on the left side on FIG. 3. Second axial side surface 43*d* of outer diameter pillar portion 43*b* is a surface inclined in both of radial direction RA and axial direction AX and reaching small annular portion 41 or inner diameter pillar portion 43*a* (inclined surface). Second axial side surface 43*d* in the cross-sectional view of FIG. 3 extends from an end closest to small annular portion 41 in FIG. 3 and flush with second outer diametrical surface 42*b*, reaching first outer diametrical surface 41*b* of small annular portion 41 or, for example, outermost surface 43*e* of inner diameter pillar portion 43*a* illustrated in FIG. 3. Then, second axial side surface 43*d* is connected to and thus continuous to either one of these surfaces.

Second axial side surface 43*d* in the cross-sectional view of FIG. 3 may preferably make an angle in the range of 20° to 40° with axial direction AX. A point at which an end flush with second outer diametrical surface 42*b* and closest to small annular portion 41 intersects with second axial side surface 43*d* may be closer to small annular portion 41 than the point at which the end flush with first inner diametrical surface 41*a* and closest to large annular portion 42 intersects with first axial side surface 43*c*. The end flush with second outer diametrical surface 42*b* and closest to small annular portion 41 may be situated at a middle position in axial direction AX of the angular ball bearing, i.e., at a point on a straight line indicative of radial direction RA of FIG. 3. Thus, an angle made by second axial side surface 43*d* with axial direction AX in the cross-sectional view of FIG. 3 may preferably be smaller than an angle made by first axial side surface 43c with axial direction AX.

Pillar portion 43 in the first example of FIG. 4 has the same shape as in FIG. 3. As illustrated in FIG. 4, a line of intersection 45 at which second axial side surface 43*d* intersects with a surface of pillar portion 43 closest to outer ring 20 in radial direction RA (flush with second outer diametrical surface 42*b*) may be situated at a middle position on a straight line in radial direction RA, i.e., on a straight line in axial direction AX. Line of intersection 45 may be situated otherwise, for example, at a position more rightward in axial direction AX than as illustrated in FIG. 4 (position closer to large annular portion 42). FIG. 5 illustrates an example in which line of intersection 45 is situated at a position considerably closer to large annular portion 42 than a middle position on a straight line in axial direction AX. In this illustrated example, line of intersection 45 is also situated at a position more rightward than pocket 44 of the large annular portion 42 (position closer to large annular portion 42). A third example, though not illustrated in the drawings, may be further suggested as an alternative choice. In this example, there is no intersection between a first end of second axial side surface 43*d* closer to large annular portion 42 and a second end on a surface of pillar portion 43 relatively close to small annular portion 41 and closest to outer ring 20 in radial direction RA (flush with second outer diametrical surface 42*b*), and the first and second ends are connected to each other with a surface extending and spreading in radial direction RA. A fourth example, though somewhat similar to the third example, may also be another alternative choice. In this example, a surface that connects the first and second ends is inclined in radial direction RA and is part of second axial side surface 43*d*, allowing second axial side surface 43*d* to have a plurality of (for example, two) surfaces. Summarizing what has been described so far, second axial side surface 43*d* may be a combination of two or more surfaces, in which case an angle(s) made by at least part of these surfaces of second axial side surface 43*d* with axial direction AX may not necessarily be between 20° and 40°.

Referring to FIG. 3, first outer diametrical surface 41*b* of small annular portion 41 is closer than first inner diametrical surface 41*a* to the center of rolling element 30 that forms pitch diameter PCD in radial direction RA. Further, second inner diametrical surface 42*a* of large annular portion 42 is closer than second outer diametrical surface 42*b* to the center of rolling element 30 that forms pitch diameter PCD in radial direction RA. Specifically, first outer diametrical surface 41*b* illustrated in FIG. 3 is closer in radial direction RA to rolling element 30 adjacent to first inner diametrical surface 41*a* than this inner diametrical surface, i.e., closer to the center of rolling element 30 that forms pitch diameter PCD in FIG. 3 (one of rolling elements 30 particularly adjacent to first outer diametrical surface 41*b* and first inner diametrical surface 41*a*). Similarly, second inner diametrical surface 42*a* illustrated in FIG. 3 is closer in radial direction RA to rolling element 30 adjacent to second outer diametrical surface 42*b* than this outer diametrical surface, i.e., closer to the center of rolling element 30 that forms pitch diameter PCD in FIG. 3 (one of rolling elements 30 particularly adjacent to second outer diametrical surface 42*b* and second inner diametrical surface 42*a*).

As illustrated in FIG. 3, first inner diametrical surface 41*a* and second outer diametrical surface 42*b* each have a cylindrical shape along axial direction AX. First inner diametrical surface 41*a* and second outer diametrical surface 42*b* may have any other tubular shape but the cylindrical shape.

As illustrated in FIGS. 3 to 8, small annular portion 41 has a first ball receiving surface 44*a* having a spherical shape which is an example of the surface facing rolling element 30. Large annular portion 42 has a second ball receiving surface 44*b* having a spherical shape which is an example of the surface facing rolling element 30. First ball receiving surface 44*a* and second ball receiving surface 44*b* constitute each one of the cavities formed in cage 40. In each pocket 44, first ball receiving surface 44*a*, second ball receiving surface 44*b* and inner surface of the cavity in the body of cage 40 are continuous to (connected to) one another, which shape this pocket.

Each pocket 44 includes the following surfaces integrally continuous to one another; first ball receiving surface 44*a*, inner wall surface of a portion of this receiving surface axially extending from one and the other end in the circumferential direction, second ball receiving surface 44*b*, and inner wall surface of a portion of this receiving surface axially extending from one and the other end in the circumferential direction.

As illustrated in FIG. 3, first outer diametrical surface 41*b* of small annular portion 41 closer to outer ring 20 and second inner diametrical surface 42*a* of large annular portion 42 closer to inner ring 10 may preferably make an angle β in the range of 5°≤β≤18° with the axial direction. The range of 8°≤β≤15° may particularly be preferable for angle β.

First outer diametrical surface 41*b* and second inner diametrical surface 42*a* may be regarded as being flush with virtual outermost surface 43*e* and innermost surface 43*f*. In this instance, virtual mating surfaces of outermost and innermost surfaces 43*e* and 43*f* make angle β in the range of 5°≤β≤18° with axial direction AX. This may be rephrased that angle β made by an interface between inner and outer diameter pillar portions 43*a* and 43*b* with axial direction AX is 5°≤β≤18°.

Referring to FIGS. 1, 9 and 10, a dimension A illustrated in these drawings indicates the distance of a clearance in radial direction RA between a surface of pocket 44 of cage 40 closest to inner ring 10 and facing rolling element 30 (innermost point on first ball receiving surface 44*a* or point close to a straight line in axial direction AX of FIG. 1) and the surface of rolling element 30 retained in pocket 44. Further, at least one of the relationships defined in the following numerical expressions is satisfied;

$$A/Da \leq 0.020 \ldots \tag{2, and}$$

$$2A/PCD \leq 0.010 \ldots \tag{3,}$$

where PCD is the pitch diameter. Dimension A illustrated in FIGS. 9 and 10 is hereinafter described in detail. With center axes of the whole angular ball bearing in axial direction AX and of cage 40 in axial direction AX overlapping (exactly falling on) each other, A is the smallest dimension value of a clearance in radial direction RA between surfaces of pocket 44 of cage 40 facing rolling element 30 and of this rolling element 30.

As illustrated in FIG. 9, the value of A may be a distance in radial direction RA between a position on the surface of cage 40 facing rolling element 30 (for example, second ball receiving surface 44*b*) closest to inner ring 10 and the surface of this rolling element 30. The value may be defined otherwise. The value of A, though not illustrated in the drawings, may be a distance in radial direction RA between a position on the surface of cage 40 facing rolling element 30 (for example, second ball receiving surface 44*b*) closest to outer ring 20 and the surface of this rolling element 30.

As a result, any abnormal noise, vibration and/or temperature rise of the bearing may be well-controlled.

As described thus far, dimension A; clearance, in radial direction RA between pocket 44 and rolling element 30 represents the smallest value of a clearance formed when neither of rolling elements 30 nor cage 40 is currently rotating. This represents the states of rolling element 30 and of cage 40 when axial center axes of the bearing and of cage 40 are overlapping each other. This may be rephrased that, at the time, there is an overlap between the center axis of cage 40 and the center of an annular shape formed by connecting the centers of rolling elements 30.

As for pillar portion 43 of cage 40 on the left and right sides of rolling element 30 in FIG. 9, a substantially lower half of this portion corresponds to inner diameter pillar portion 43*a*, while a substantially upper half corresponds to outer diameter pillar portion 43*b*. Thus, the "A" represents a clearance between an innermost point of inner diameter pillar portion 43*a* and the surface of rolling element 30 radially immediate above the point.

Figure 11:
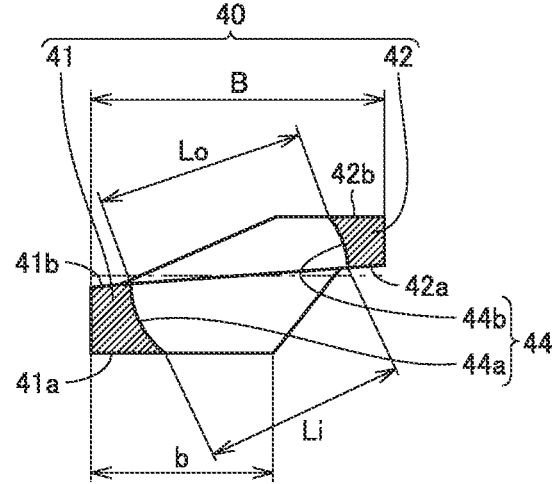
FIG. 11 is a schematic view in cross section of uppermost parts in FIG. 3 illustrated with their dimensions.

FIG. 11 is a schematic view in cross section of uppermost parts in FIG. 3 illustrated with their dimensions. Referring to FIG. 11, in cage 40, at least one of a pocket inlet diameter Lo on the outer diameter side and a pocket inlet diameter Li on the inner diameter side has a value less than a diameter Da of rolling element 30. The following relationship is satisfied;

$$b \geq 0.5B \ldots \tag{4,}$$

where b is the length of a straight part of pillar portion 43 on at least one of a side closest to outer ring 20 in radial direction RA and a side closest to inner ring 10 in radial direction RA (a side closest to inner ring 10 in radial direction RA in the example of FIG. 11), and B is the width of cage 40 in axial direction AX, i.e., the dimension of cage 40 in the direction of width of the whole bearing. Here, length b of the straight part indicates a length along first inner diametrical surface 41*a* of a surface of inner diameter pillar portion 43*a* closest to inner ring 10 in radial direction RA from an end of first inner diametrical surface 41*a* closer to small annular portion 41 to an end of first axial side surface 43*c* closest to small annular portion 41. Length b of the straight part may be otherwise defined; it may be, for example, a length along second outer diametrical surface 42*b* of a surface of outer diameter pillar portion 43*b* closest to outer ring 20 in radial direction RA from an end of second outer diametrical surface 42*b* closer to large annular portion 42 to an end of second axial side surface 43*d* closest to large annular portion 42.

Next, operational effects of the angular ball bearing according to this embodiment thus characterized are hereinafter described.

The angular ball bearing according to this embodiment includes inner ring 10, outer ring 20, rolling elements 30, and cage 40. Inner ring 10 has, on its outer circumferential surface, inner ring raceway surface 10*a*. Outer ring 20 is disposed on the outer side than inner ring 10 and has, on its inner circumferential surface, outer ring raceway surface 20*a*. Rolling elements 30 are disposed between inner ring raceway surface 10*a* and outer ring raceway surface 20*a*. Rolling elements 30 each contact inner and outer ring raceway surfaces 10*a* and 20*a* at positions at which angle of contact α is made with radial direction RA. Cage 40 is disposed between inner ring raceway surface 10*a* and outer ring raceway surface 20*a*. Cage 40 retains rolling elements 30 in a manner that rolling elements 30 are annularly arranged and circumferentially spaced at certain intervals.

Cage 40 has pockets 44 in which rolling elements 30 are retainable. Pockets 44 are circumferentially spaced at certain intervals. Cage 40 is asymmetrical to a radially extending straight line. Supposing that a is the angle of contact of rolling element 30, α is defined as 30°≤α≤45°. The relationship defined in the following numerical expression is satisfied, where D is the outer diameter of outer ring 20, d is the inner diameter of inner ring 10, and Da is the diameter of rolling element 30.

[Numerical Expression 3]

$$0.62 \leq \frac{2D_a}{D-d} \leq 0.80 \qquad (1)$$

With center axes of the whole bearing (angular ball bearing) in axial direction AX and of cage 40 in axial direction AX overlapping each other, at least one of the following relationships is satisfied;

$$A/Da \leq 0.020 \ldots \qquad (2), \text{ and}$$

$$2A/PCD \leq 0.010 \ldots \qquad (3),$$

where A is the smallest dimension value of a clearance in radial direction RA between surfaces of pocket 44 of cage 40 facing rolling element 30 and of this rolling element 30, and PCD is the pitch diameter of each rolling element 30.

Relatively large angles of contact α; 30°≤α≤45°, may result in greater load-carrying capacities in both of the axial and radial directions of the angular ball bearing. The range of angle of contact α may be 30°≤α≤45°. The numerical expression (1) may teach that the angular ball bearing may preferably employ rolling elements 30 having a relatively large diameter Da, as compared with outer diameter D of outer ring 20 or inner diameter d of inner ring 10. This may allow the angular ball bearing to have a higher load-carrying capacity. In case the value of the numerical expression (1) is less than 0.62, diameter Da of rolling element 30 may fail to be large enough, as compared with outer diameter D of outer ring 20 or inner diameter d of inner ring 10. As a result, improvement of the load-carrying capacity may be difficult to achieve. The value of the numerical expression (1) greater than 0.80, on the other hand, may fail to secure an adequate strength of cage 40 and adequate thicknesses in the direction of width of inner and outer rings 10 and 20 that are suitable for the diameter of rolling element 30. If diameter Da of rolling element 30 alone is overly increased without substantial increase of the dimension in axial direction AX, i.e., width, of the bearing, an interval between rolling element 30 and an end of the bearing in the direction of width may be narrower. As a result, cage 40 can only afford a narrower space. Thus, the value of the numerical expression (1) may preferably be greater than or equal to 0.62 and less than or equal to 0.80. Of the values in this numerical range, the value of the numerical expression (1) may desirably be greater than or equal to 0.64 and more desirably be greater than or equal to 0.66. This may achieve an even higher load-carrying capacity of the angular ball bearing. The value of the numerical expression (1) may more desirably be less than or equal to 0.78. A particularly desirable numerical range of this value may be less than or equal to 0.75.

Figure 12:
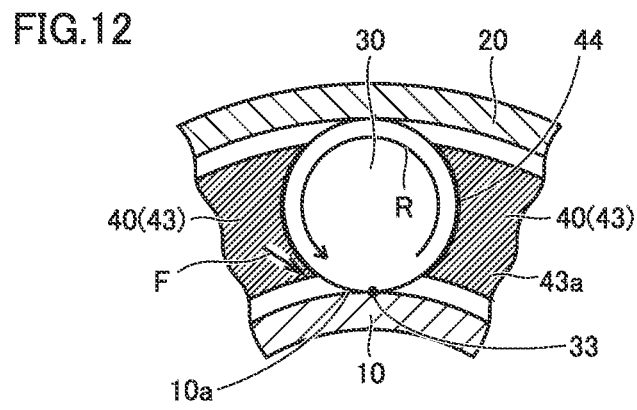
FIG. 12 is a schematic view in cross section of a region corresponding to FIG. 9 in a comparative example of this embodiment.

FIG. 12 is a schematic view in cross section of a region corresponding to FIG. 9 in a comparative example of this embodiment. Referring to FIG. 12, an angular ball bearing of the comparative example is basically configured similarly to the angular ball bearing according to this embodiment, structural elements of which, therefore, will not be described in detail. This comparative example illustrated in FIG. 12, however, lacks the clearance of dimension A illustrated in FIG. 9, which is a difference to FIG. 9.

In this embodiment, cage 40 is asymmetrical to a straight line extending radial direction RA, and angle of contact α of rolling element 30 stays in the range of 30°≤α≤45°. Thus, small annular portion 41 of cage 40 is intentionally displaced toward inner ring 10 from the center of rolling element 30 in the radial direction. Also, large annular portion 42 of cage 40 is displaced, for example, toward outer ring 20 from the center of rolling element 30 in the radial direction. This may surely allow cage 40 to have an adequate area in cross section, promising a sufficient strength of the cage required of the angular ball bearing. Pocket 44 of cage 40 illustrated in FIG. 12 is spherical at least in part. In the case of no clearance of dimension A between pocket 44 and inner diameter pillar portion 43a of cage 40 as illustrated in FIG. 12, the boundary between inner diameter pillar portion 43a and pocket 44 is somewhat close to a point of intersection 33 at which a straight line extending radially, i.e., vertically in FIG. 12, from the center of rolling element 30 intersects with inner ring raceway surface 10a. Point of intersection 33 is a point of contact between rolling element 30 and inner ring raceway surface 10a. During use of the angular ball bearing having laterally asymmetrical cage 40 as illustrated in FIG. 3, rolling element 30 rotates on its own axis in a direction indicated with an arrow R in this drawing. This increases a force indicated with an arrow F in FIG. 12 that drags cage 40 in a direction toward point of intersection 33 in a region adjacent to pocket 44 of cage 40. When rolling element 30, while rotating, thus drags cage 40, the rotation of rolling element 30 may typically slow down, which generates a difference in speed between inner and outer rings 10 and 20 and rolling element 30. Such a difference in speed occurs because rolling element 30 is decelerated. This may accelerate sliding motion between rolling element 30 and inner ring raceway surface 10a, possibly leading to abnormal noise, vibration and/or temperature rise between inner and outer rings 10 and 20 and rolling element 30. These problems may be particularly noticeable in any grease-lubricated angular ball bearings with greater resistance to stirring.

To satisfy at least one of the relationships as in A/Da≤0.020 . . . (2) and 2A/PCD≤0.010 . . . (3), the clearance of dimension A is provided that is the shortest distance between the surface of rolling element 30 and a straight line extending in radial direction RA from a point on first ball receiving surface 44a or second ball receiving surface 44b; inner surface of pocket 44 facing the rolling element. The amount of motion of cage 40 during use of the angular ball bearing may be suitably controlled through fine adjustment of dimension A of the clearance right for at least one of PCD and diameter Da of the rolling element of the angular ball bearing. Thus, cage 40 may excel in stability when the angular ball bearing is being operated. With dimension A being thus adjusted, any difference in speed among inner ring 10, outer ring 20 and rolling element 30 may reduce or may not occur. Any difference in speed may be thus avoidable because the rotation of rolling element 30 on its own axis is free of restriction and is accordingly not decelerated. This may reliably control the risks of abnormal noise, vibration, and/or temperature rise that possibly occur with inner and outer rings 10 and 20 and rolling element 30 due to any difference in speed between inner ring 10, outer ring 20, and rolling element 30.

The angular ball bearing may be configured as described below. Inner ring 10 includes first counter-bored portion 11 and first shoulder portion 12 bulging toward outer ring 20 as compared with first counter-bored portion 11. Outer ring 20 includes second counter-bored portion 21 and second shoulder portion 22 bulging toward inner ring 10 as compared with second counter-bored portion 21. Cage 40 includes small annular portion 41, large annular portion 42, and pillar portions 43. Small annular portion 41 is disposed between first counter-bored portion 11 and second shoulder portion 22. Large annular portion 42 is disposed between second counter-bored portion 21 and first shoulder portion 12. Pillar portions 43 are each interposed between rolling elements 30 circumferentially arranged next to each other. Pillar portions 43 each have inner diameter pillar portion 43a and outer diameter pillar portion 43b. Inner diameter pillar portion 43a extends from small annular portion 41 toward large annular portion 42 along axial direction AX. Outer diameter pillar portion 43b extends from large annular portion 42 toward small annular portion 41 along axial direction AX. A side of inner diameter pillar portion 43a closest to outer ring 20 (outermost surface 43e) and a side of outer diameter pillar portion 43b closest to inner ring 10 (innermost surface 43f) are connected to form pillar portion 43 in which inner diameter pillar portion 43a and outer diameter pillar portion 43b are integral with each other. This may allow cage 40 to have a sufficient area in cross section, promising a sufficient strength of this cage required of the angular ball bearing.

The angular ball bearing may be configured as described below. Inner diameter pillar portion 43a has, on a side thereof closer to large annular portion 42, first axial side surface 43c inclined in both of radial direction RA and axial direction AX and reaching large annular portion 42 or outer diameter pillar portion 43b. Outer diameter pillar portion 43b has, on a side thereof closer to small annular portion 41, second axial side surface 43d inclined in both of radial direction RA and axial direction AX and reaching small annular portion 41 or inner diameter pillar portion 43a. In radial direction RA, first outer diametrical surface 41b of small annular portion 41 closest to outer ring 20 is closer to, among the plurality of rolling elements 30, the center of rolling element 30 adjacent to first outer diametrical surface 41b and first inner diametrical surface 41a and forming pitch diameter PCD than first inner diametrical surface 41a of small annular portion 41 closest to inner ring 10. In radial direction RA, second inner diametrical surface 42a of large annular portion 42 closest to inner ring 10 is closer to, among the plurality of rolling elements 30, the center of rolling element 30 adjacent to second outer diametrical surface 42b and second inner diametrical surface 42a and forming pitch diameter PCD than second outer diametrical surface 42b of large annular portion 42 closest to outer ring 20. Small annular portion 41 has first ball receiving surface 44a having a spherical shape which is an example of the surface facing rolling element 30. Large annular portion 42 has second ball receiving surface 44b having a spherical shape which is an example of the surface facing rolling element 30. This may allow cage 40 to have a sufficient area in cross section, promising a sufficient strength of this cage required of the angular ball bearing.

In the angular ball bearing, first outer diametrical surface 41b of small annular portion 41 closer to outer ring 20 and second inner diametrical surface 42a of large annular portion 42 closer to inner ring 10 may preferably make angle β in the range of 5°≤β≤18° with axial direction AX. During the production process of cage 40, mating surfaces of virtual outermost and innermost surfaces 43e and 43f of inner and outer diameter pillar portions 43a and 43b make angle β in the range of 5°≤β≤18° with axial direction AX. In case cage 40 is formed by injection molding, the mating surfaces may preferably make a certain angle with axial direction AX instead of extending and spreading in axial direction AX, so that a clamping force is reliably transmitted to these mating surfaces. Angle β of the mating surfaces with the axial direction may preferably be set to a degree greater than or equal to 5°. Then, in a case that diameter Da of rolling element 30 is increased, a portion of cage 40 thinnest in the direction of width may be allowed to have a required or even greater thickness without any substantial increase in width of cage 40 with respect to diameter Da. Cage 40 may be allowed to have a sufficient area in cross section by setting angle β to a degree less than or equal to 18°.

The angular ball bearing may be configured as described below. In cage 40, at least one of pocket inlet diameter Lo on the outer diameter side and pocket inlet diameter Li on the inner diameter side is smaller than diameter Da of rolling element 30. The following relationship is satisfied;

$$b \geq 0.5B \ldots \tag{4}$$

where b is the length of a straight part of pillar portion 43 on at least one of a side closest to outer ring 20 in radial direction RA and a side closest to inner ring 10 in radial direction RA, and B is the width of cage 40 in axial direction AX. Thus, rolling element 30 retained in pocket 44 may be prevented from falling off out of pocket 44 on at least one of sides of pillar portion 43 respectively closest to outer ring 20 and to inner ring 10 in radial direction RA. Rolling element 30 may involve the risk of jumping out of pocket 44 from at least one side, failing to be retained in cage 40. This risk may be successfully avoided. In this embodiment, at least one of pocket inner diameter Lo on the outer diameter side and pocket inner diameter Li on the inner diameter side may be less than or equal to 0.995 times of Da, where Da is the diameter of rolling element 30.

In the angular ball bearing, cage 40 may be made of a synthetic resin. Cage 40 made of such a material may serve well as a rolling element guide that can effectively adjust the position and rotary motion of rolling element 30. Cage 40 may preferably be made of a synthetic resin by injection molding or cutting. This may facilitate the formation of cage 40.

Example 1

A test was carried out to verify that the numerical expressions (2) and (3) can present a favorable result. In the test was used angular ball bearings each having the following dimensions; inner diameter d of 40 mm, outer diameter D of 90 mm, and width in axial direction AX of 23 mm of FIG. 1. Other relevant dimensions were; PCD was the pitch diameter and Da was the diameter of rolling element 30 as illustrated in FIG. 1, and A was the clearance dimension illustrated in FIG. 9. These dimensions were all expressed in the unit of mm For the test, 10 sample angular ball bearings were prepared, in which values of 2A/PCD and A/Da were variously changed.

Figure 13:
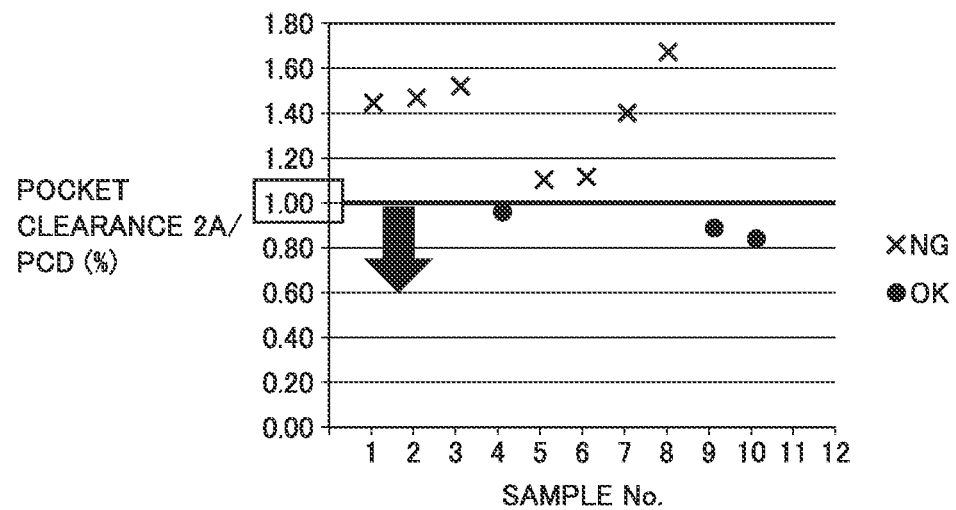
FIG. 13 is a graph of valuers of 2A/PCD in Table 1.
Figure 14:
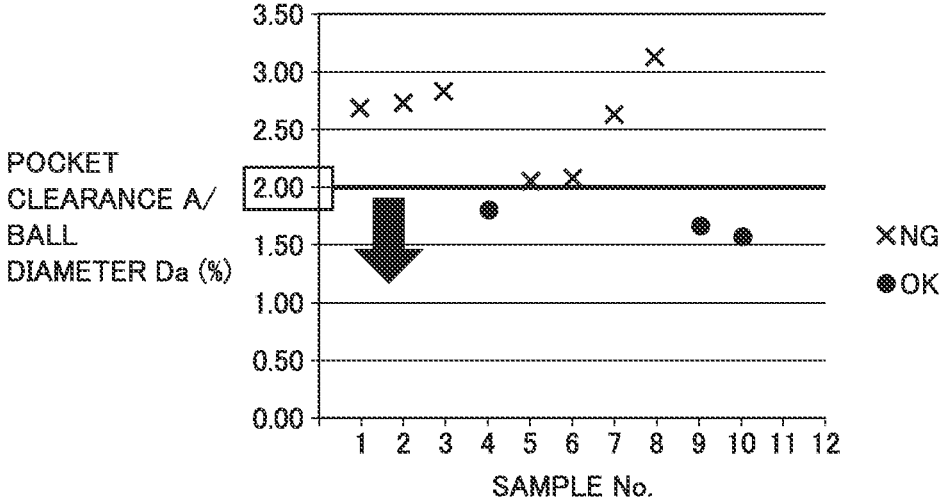
FIG. 14 is a graph of valuers of A/Da in Table 1.

These samples were numbered 1 to 10. These 10 different samples were subjected to grease lubrication and then used. During the test was checked whether noise, vibration and/or temperature rise occurred between inner ring 10 or outer ring 20 and rolling elements 30. Table 1 shows the obtained result. FIG. 13 is a graph of valuers of 2A/PCD in Table 1. In the graph of FIG. 13, its lateral axis represents the sample numbers, and its vertical axis represents the 2A/PCD values. FIG. 14 is a graph of valuers of A/Da in Table 1. In the graph of FIG. 14, its lateral axis represents the ample number, and its vertical axis represents the A/Da value. These values were all expressed in the unit of %.

TABLE 1

| No | Pocket clearance 2A/PCD (%) | Pocket clearance A/rolling element diameter Da (%) | Good/ Poor |
|---|---|---|---|
| 1 | 1.44 | 2.69 | x |
| 2 | 1.47 | 2.73 | x |
| 3 | 1.52 | 2.83 | x |
| 4 | 0.97 | 1.81 | o |
| 5 | 1.10 | 2.04 | x |
| 6 | 1.11 | 2.07 | x |
| 7 | 1.40 | 2.60 | x |
| 8 | 1.67 | 3.11 | x |
| 9 | 0.88 | 1.65 | o |
| 10 | 0.84 | 1.57 | o |

Referring to Table 1 and FIGS. 13 and 14, sample Nos. 4, 9 and 10 successfully prevented the occurrence of noise, vibration and/or temperature rise between inner ring 10 or outer ring 20 and rolling element 30. The bearings satisfying both of the numerical expressions (2) and (3) succeeded in control of noise, vibration and/or temperature rise between inner ring 10 or outer ring 20 and rolling element 30.

While this example conducted the test on whether both of the numerical expressions (2) and (3) were satisfied, a similar result may be expected when either one of the numerical expressions (2) and (3) is satisfied.

All of the embodiments are disclosed herein by way of illustration and example only and should not be construed as limiting by any means the scope of this disclosure. The scope of this disclosure is solely defined by the appended claims and is intended to cover the claims, equivalents, and all of possible modifications made without departing the scope of this disclosure.

REFERENCE SIGNS LIST

10: inner ring, 10a: inner ring raceway surface, 11: first counter-bored portion, 11a, 21a: first portion, 11b, 21b: second portion, 11r, 21r: step, 12: first shoulder portion, 20: outer ring, 20a: outer ring raceway surface, 21: second counter-bored portion, 22: second shoulder portion, 30: rolling element, 31: inner ring contact point, 32: outer ring contact point, 33: point of intersection, 40: cage, 41: small annular portion, 41a: first inner diametrical surface, 41b: first outer diametrical surface, 42: large annular portion, 42a: second inner diametrical surface, 42b: second outer diametrical surface, 43: pillar portion, 43a: inner diameter pillar portion, 43b: outer diameter pillar portion, 43c: first axial side surface, 43d: second axial side surface, 43e: outermost surface, 43f: innermost surface, 44: pocket, 44a: first ball receiving surface, 44b: second ball receiving surface, 45: line of intersection, AX: axial direction, RA: radial direction

The invention claimed is:

1. An angular ball bearing, comprising:

an inner ring comprising an inner ring raceway surface on an outer circumferential surface thereof;

an outer ring comprising an outer ring raceway surface on an inner circumferential surface thereof such that the outer ring raceway surface of the outer ring and the inner ring raceway surface of the inner ring face each other;

a plurality of rolling elements disposed between the inner ring raceway surface and the outer ring raceway surface, the rolling elements each contacting the inner ring raceway surface and the outer ring raceway surface at positions at which an angle of contact is made with a radial direction; and a cage disposed between the inner ring raceway surface and the outer ring raceway surface, the cage serving to retain the plurality of rolling elements in a manner that the plurality of rolling elements are annularly arranged and circumferentially spaced at intervals, the cage comprising a plurality of pockets in which the plurality of rolling elements are retainable, the pockets being circumferentially spaced at intervals, the cage being asymmetrical to a straight line extending in the radial direction, a value of $\alpha$ being defined as $30° \leq \alpha \leq 45°$, where the $\alpha$ is the angle of contact of the rolling element, the relationship defined in the following numerical expression is satisfied:

$$0.62 \leq \frac{2D_a}{D-d} \leq 0.80$$

where D is an outer diameter of the outer ring, d is an inner diameter of the inner ring, and Da is a diameter of the rolling element, with center axes of a whole bearing in an axial direction and of the cage in the axial direction overlapping each other, at least one of the following relationships is satisfied:

$A/Da \leq 0.020$; and $2A/PCD \leq 0.010$, where A is a smallest dimension value of a clearance in the radial direction between surfaces of the pocket of the cage facing the rolling element and of the rolling element, and PCD is a pitch diameter of the plurality of rolling elements, wherein the inner ring comprises:

a first counter-bored portion; and a first shoulder portion bulging toward the outer ring as compared with the first counter-bored portion, the outer ring comprises:

a second counter-bored portion; and a second shoulder portion bulging toward the inner ring as compared with the second counter-bored portion, the cage comprises:

a first annular portion disposed between the first counter-bored portion and the second shoulder portion;

a second annular portion disposed between the second counter-bored portion and the first shoulder portion; and a pillar portion interposed between the plurality of rolling elements circumferentially arranged next to each other, the pillar portion comprises:

an inner diameter pillar portion extending from the first annular portion toward the second annular portion along the axial direction; and an outer diameter pillar portion extending from the second annular portion toward the first annular portion along the axial direction, a side of the inner diameter pillar portion closest to the outer ring and a side of the outer diameter pillar portion closest to the inner ring are connected to form the pillar portion in which the inner diameter pillar portion and the outer diameter pillar portion are integral with each other, the outer diameter pillar portion comprises a second axial side surface on a side closer to the first annular portion than the second annular portion, the second axial side surface being a surface inclined in both of the radial direction and the axial direction and reaching the first annular portion or the inner diameter pillar portion, and the second axial side surface is a combination of two or more surfaces, and an angle made by at least part of these surfaces of the second axial side surface with the axial direction is less than 20° or more than 40°.

2. The angular ball bearing according to claim 1, wherein the smallest dimension value A represents a distance in the radial direction between a position on the surface of the cage facing the rolling element on a side closest to the inner ring and the surface of the rolling element.

3. The angular ball bearing according to claim 1, wherein the inner diameter pillar portion comprises a first axial side surface on a side closer to the second annular portion than the first annular portion, the first axial side surface being a surface inclined in both of the radial direction and the axial direction and reaching the second annular portion or the outer diameter pillar portion, in the radial direction, a first outer diametrical surface of the first annular portion is closer to a pitch circle diameter in the radial direction than a first inner diametrical surface of the first annular portion, in the radial direction, a second inner diametrical surface of the second annular portion is closer to the pitch circle diameter in the radial direction than a second outer diametrical surface of the second annular portion, the first annular portion comprises a first ball receiving surface having a spherical shape as the surface facing the rolling element, and the second annular portion comprises a second ball receiving surface having a spherical shape as the surface facing the rolling element.

4. The angular ball bearing according to claim 3, wherein the first outer diametrical surface of the first annular portion closer to the outer ring and the second inner diametrical surface of the second annular portion closer to the inner ring make an angle ß in a range of 5°≤β≤18° with the axial direction.

5. The angular ball bearing according to claim 1, wherein at least one of a pocket inlet diameter on an outer diameter side and a pocket inlet diameter on an inner diameter side of the cage has a value less than a diameter of each of the plurality of rolling elements, and the following relationship is satisfied: b≥0.5B, where b is a length of a straight part of the pillar portion on at least one of a side closest to the outer ring in the radial direction or a side closest to the inner ring in the radial direction, and B is a width of the cage in the axial direction.

6. The angular ball bearing according to claim 1, wherein the cage includes a synthetic resin.

* * * * *